United States Patent [19]

Madsen et al.

[11] 4,059,024

[45] Nov. 22, 1977

[54] GEAR TRAIN WITH INTEGRAL STOP

[75] Inventors: Elmer W. Madsen, Bristol; George B. Soden, Wolcott, both of Conn.

[73] Assignee: North American Philips Corporation, New York, N.Y.

[21] Appl. No.: 741,374

[22] Filed: Nov. 12, 1976

[51] Int. Cl.² .................... F16H 1/12; F16H 55/04
[52] U.S. Cl. .................... 74/421 R; 74/434; 74/437
[58] Field of Search ............... 74/421 R, 434, 412 R, 74/437

[56] References Cited

U.S. PATENT DOCUMENTS

| | | | |
|---|---|---|---|
| 2,911,846 | 11/1959 | Platt | 74/434 X |
| 3,331,331 | 7/1967 | Irgens et al. | 74/434 UX |

*Primary Examiner*—Leonard H. Gerin
*Attorney, Agent, or Firm*—Frank R. Trifari; Robert S. Smith

[57] ABSTRACT

A gear train includes a plurality of gears mounted for cooperation. Two of the gears are provided with at least one projection from the side of the gear in a direction generally parallel to the axis thereof. In operation the projections on the gears interfere at a predetermined angular position to limit movement of the gear train.

7 Claims, 6 Drawing Figures

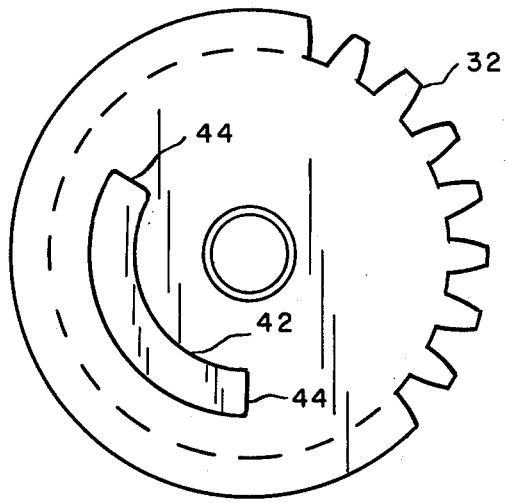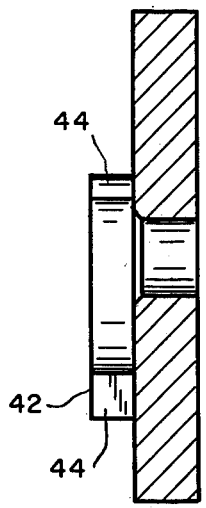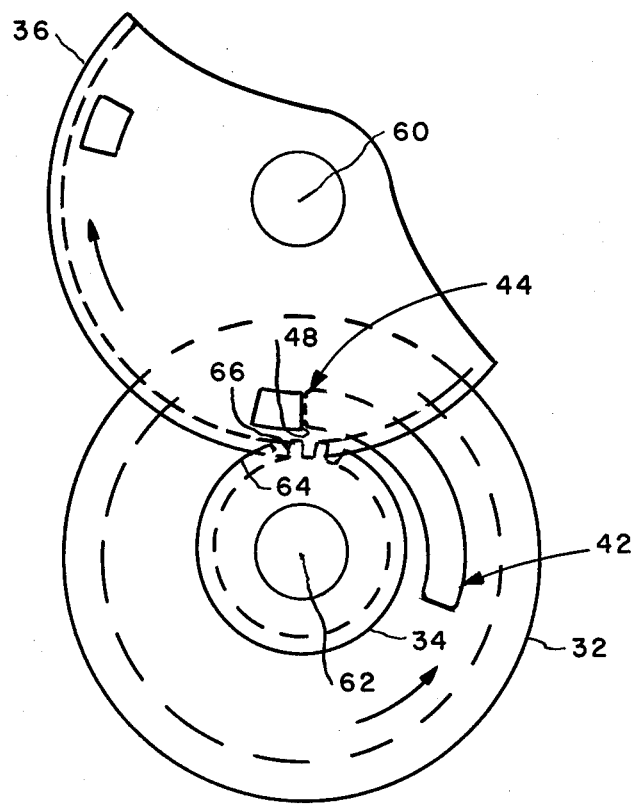

GEAR TRAIN WITH INTEGRAL STOP

BACKGROUND OF THE INVENTION

The invention relates to gears and particularly to gear trains having stops to limit the gear train at some predetermined angular position. In various application it may, for example, be desirable to provide a motor which drives a gear train through a given angular travel. The limit on the traven is desirably a physical stop. In some such applications the motor will be supplied electrical power with the gear train at its stop position until some predetermined event at which time the motor will be reversed. A problem with stops which have frequently been used heretofore is that the stops that are sufficiently strong must be relatively large. Another problem is that the expense of installing a discrete stop may be significant. Still another problem is that the impact upon hitting the stop may be so great that damage to the gear train results.

It is an object of the present invention to provide a gear train which will have a stop to limit the travel thereof which will not require other discrete parts.

It is also a object of the invention to provide such apparatus which is simple and inexpensive both to manufacturer and to assemble and which will minimize the impact forces.

It is still another object of the invention to provide a gear train having an integral stop which will be compact and therefore suitable for more applications.

SUMMARY OF THE INVENTION

In accordance with the invention in one form a gear train comprises a plurality of gears. Each gear is engaged with at least one other gear in the train. At least two of the gears in the train have surfaces extending from the side thereof, which during one predetermined angular position of the gear train, will interfer and prevent further movement of the gear train in one direction.

In one form the angular phasing of the surfaces extending from the side of each gear is such that interference occurs concurrently with maximum engagement between one tooth of the gear on which the interferring surface is mounted and one tooth of each gear which cooperates therewith.

BRIEF DESCRIPTION OF THE DRAWING

The invention will be better understood by reference to the accompanying drawing in which:

FIG. 2 is a side view of a first gear shown in FIG. 1;

FIG. 3 is a section view of the first gear shown in FIG. 2 taken through the axis of that gear in a plane perpendicular to the view of FIG. 2;

FIG. 6 is a simplified diagrammatic view illustrating the geometric relationship of the centers of the gears, two interfering surfaces and the cooperating gears.

DESCRIPTION OF THE PREFERRED EMBODIMENT

Figure 1:
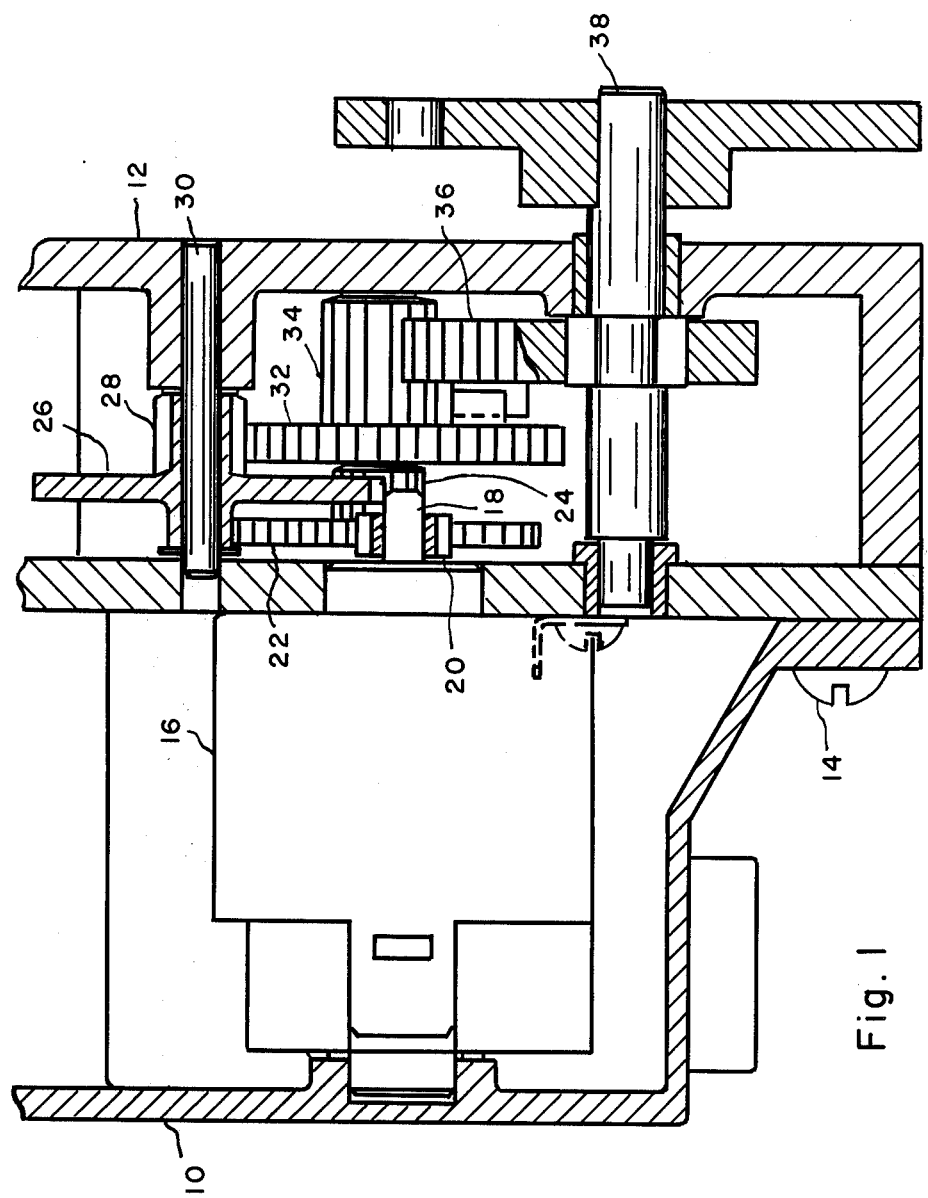
FIG. 1 is elevational view in partial section of a gear train assembly in accordance with the invention.
Figure 4:
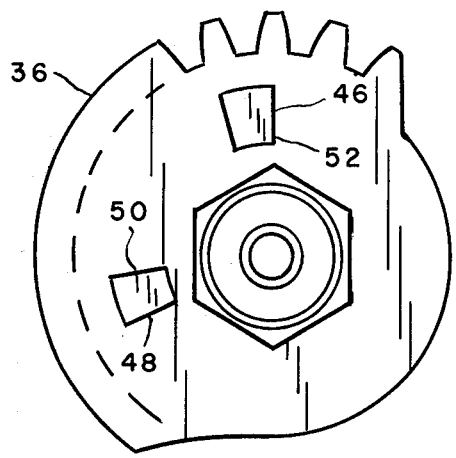
FIG. 4 is a side view of a second gear shown in FIG. 1.
Figure 5:
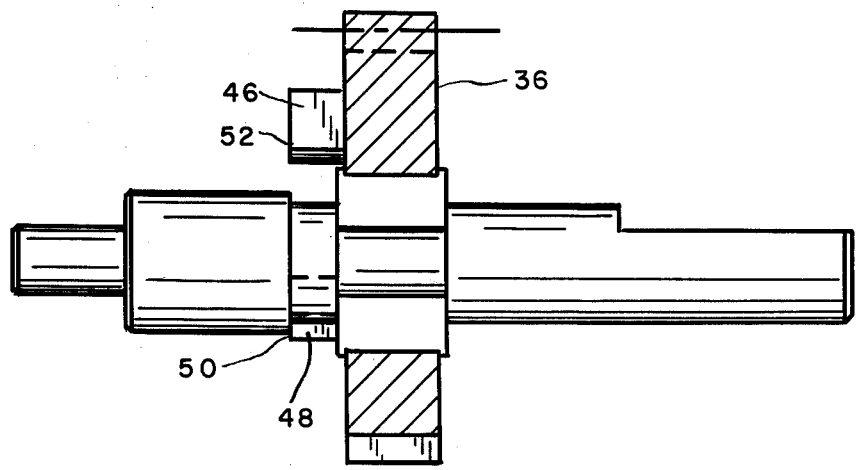
FIG. 5 is a view in partial section of the gear shown in FIG. 4 taken through a plane at right angles to the view of FIG. 4 and through the axis of the second gear.

Referring now to FIG. 1, there is shown a first housing 10 which is fixed to a second housing 12 by means of bolts 14 (1 shown). In housing 10 there is an electric motor 16 having an output shaft 18 which carries a gear 20. Gear 20 has a press fit with respect to the output shaft 18. The gear 20 engages a second gear 22. Fixed to the gear 22 is a pinion gear 24 which rotates with gear 22 and drivingly engages gear 26. A pinion gear 28 is fixed to the gear 26 and rotates with it about the axis 30. The pinion gear 28 engages gear 32 which is fixed to a pinion gear 34. The pinion gear 34 drives a gear 36 which is staked or otherwise fixed to output shaft 38.

The construction of gears 32 and 36 will be better understood by reference respectively to FIGS. 2, 3, 4, and 5. Gear 32 has a raised arcuate interference surface disposed with the center of the arcuate size generally coincident with the center of the gear 32. The planar ends 44 are the surfaces which cooperates with the planar surfaces 46 and 48 respectively of the interference members 50 and 52. Members 50 and 52 are generally post shaped and extend generally parallel to the axis of gear 36. It will be understood that the gear 36 has a non-circular contour in the embodiment shown and that the output shaft 38 to which it is fixed travels through a maximum of 120° of angular rotation.

The diagrammatic view of FIG. 6 illustrates the geometric relationship of the gears 36, 32, and 34 and more particularly shows one embodiment. In this form gear 36 rotates clockwise whenever the gear 32 and gear 34 are rotating counterclockwise. It is desirable that the stops 50 and 42 interfer at a time when they are intermediate the axis 60 and 62 respectively of gears 36 and 32. It is further desirable that the interference between the surfaces 44 and 48 occur simultaneously with the maximum contact between the gear tooth face 64 of gear 34 and gear tooth face 66 of gear 36. This geometric relationship insures the maximum structural integrity because the closing speed between surfaces 34 and 38 will be minimized and the maximum contact will be obtained between gear tooth face 64 and gear tooth face 66.

While the invention has been described in terms of a preferred embodiment it will be understood that the gears need not be conventional spur gears and maybe hypoid or other gears such as bevel gears. Similarly the gears which carry the interferring surfaces need not be disposed with each on different geometric axis. In other forms of the invention they may be disposed with the same geometric axis or with the geometric axis on one oblique relation to the other. At the time of maximum contact between the gear tooth face 64 and gear tooth face 66, the contact will be planar. The plane of contact in the preferred embodiment between the gear tooth faces 64 and 66 preferably are disposed in a plane extending between the axis of the gear 32 and the axis of the gear 36. The location of the stop at a specific stage in the gear train may be varied to vary the angular travel between stop positions. The first and second gears may preferably be molded or cast because of the contours thereof.

Having thus described my invention I claim:

1. A gear train having an integral stop which comprises:
   a plurality of gears in cooperating meshed relationship with cooperation with an associated means for driving, each of said gears in said plurality of gears being meshed with at least one of said other gears; at least first and second gears of said plurality of gears each having at least one surface extending in a direction generally the same as the direction of the axis of said gear, said surfaces interfering and preventing further movement of said train in one direction when said gear train is in one angular position.

2. The apparatus as described in claim 1 wherein said surface of said first gear is arcuate and disposed with the center thereof generally coincident with the axis of said first gear.

3. The apparatus as described in claim 2 wherein said second gear further includes a second surface engaging said arcuate surface on said first gear during a second angular position of said gear train.

4. The apparatus as described in claim 1 wherein the geometric axis of said first gear is coincident with the geometric axis of said second gear.

5. The apparatus as described in claim 1 wherein the interference of said surface on said first gear and said surface on said second gear occurs simultaneously with a maximum engagement of at least one tooth on said first and second gears with a cooperating gear tooth on another gear in said gear train.

6. The apparatus as described in claim 5 wherein said interference of said surface on said first gear and said surface on said second gear occurs intermediate the axis of said first gear and said second gear.

7. The apparatus as described in claim 6, where said interference surface have planar contact in said one angular position, said planar contact occurring within a plane extending between the axis of said first gear and the axis of said second gear.

* * * * *